United States Patent [19]
Pees et al.

[11] Patent Number: 5,944,154
[45] Date of Patent: Aug. 31, 1999

[54] SUSPENSION DAMPER WITH POLYGONAL RESERVOIR TUBE

[75] Inventors: James Mitchell Pees, Centerville; David Adolph Bobinger, Middletown, both of Ohio

[73] Assignee: General Motor Corporation, Detroit, Mich.

[21] Appl. No.: 08/942,424

[22] Filed: Oct. 1, 1997

[51] Int. Cl.[6] .................................................... F16F 5/00
[52] U.S. Cl. ........................ 188/315; 188/322.9; 92/161
[58] Field of Search .................................. 188/315, 313, 188/322.19; 92/161

[56] References Cited

U.S. PATENT DOCUMENTS

| | | | |
|---|---|---|---|
| 2,025,199 | 12/1935 | Funston | 188/315 |
| 5,638,927 | 6/1997 | Cheatham et al. | 188/315 |
| 5,855,137 | 1/1999 | Weber | 72/398 |
| 5,887,857 | 3/1999 | Perrin | 72/398 |

FOREIGN PATENT DOCUMENTS

| | | | |
|---|---|---|---|
| 0579093 | 7/1958 | Italy | 188/322.19 |
| 2076933 | 12/1981 | United Kingdom | 188/322.19 |

*Primary Examiner*—Robert J. Oberleitner
*Assistant Examiner*—Hargobind S. Sawhney
*Attorney, Agent, or Firm*—Robert M. Sigler

[57] ABSTRACT

A suspension damper includes a piston that is reciprocally carried in a circular cylindrical cylinder tube. The piston is attached to a piston rod that extends out from the cylinder tube and is adapted for connection to one of the sprung or unsprung masses of an associated vehicle. The circular cylindrical cylinder tube is carried in a reservoir tube that is adapted for connection to the other of the sprung and unsprung masses. The reservoir tube includes a section with a polygonal cross section and includes an open end with a circular cross section. The open end is closed by a rod guide assembly that engages the reservoir tube and the cylinder tube. The reservoir tube includes a closed end opposite the open end that is optionally polygonal or circular in configuration.

20 Claims, 7 Drawing Sheets

SUSPENSION DAMPER WITH POLYGONAL RESERVOIR TUBE

TECHNICAL FIELD

The present invention relates to a suspension damper with a polygonal reservoir lube, and more particularly, to a vehicle suspension damper with a round cylinder tube, rod and piston assembly, carried in a polygonal reservoir tube.

BACKGROUND OF THE INVENTION

Conventional vehicle suspension dampers typically consist of direct double-acting telescopic hydraulic dampers and are generally described as either shock absorbers or struts. This basic arrangement has been successfully used for well over half a century. A primary purpose of shock absorbers is to dampen oscillations of the vehicle's suspension springs. This is accomplished by converting kinetic energy in the form of motion between the sprung and unsprung masses of the vehicle into heat and then dissipating the heat. Struts also serve this capacity and in addition, act as a structural member to support reaction and side load forces on the suspension system.

Twin-tube dampers that provide a reservoir between the cylinder tube and a reservoir tube are well known. To house the twin-tube damper, a circular cylindrical reservoir tube having a closed bottom portion is generally provided. The top end of the circular cylindrical tube generally includes an opening through which the piston rod extends, and is typically provided with a means of sealing the area of the opening around the piston rod. Various techniques are presently used to close the ends of the circular cylindrical tubular sections for suspension dampers. One method is to weld a bottom closure to the tube. Another involves roll forming the wall of the tube to produce an integral closure.

Suspension dampers have evolved over the years, with the valving and rod guide components taking innumerable configurations and present day dampers are known in passive, adaptive, semi-active and active forms. Over the same period, the cylinder tube and, in the case of a twin-tube damper, the cylinder tube and the reservoir tube, have remained steadfastly unchanged. For example, U.S. Pat. No. 2,025,199 issued Dec. 24, 1935. That patent shows a direct acting shock absorber with a cylinder comprising "concentric" circular tubular members. U.S. Pat. No. 5,638,927 issued Jun. 17, 1997 and likewise shows a suspension damper with circular cylindrical cylinder and reservoir tubes. Accordingly, it appears the art has determined that circular cylindrical cylinder and reservoir tubes are optimal.

It is known that the bending moment of inertia for a circular cylindrical reservoir tube of a certain thickness is defined by the equation:

$$I = \frac{\pi}{64}(D^4 - d^4),$$

where D is the outside diameter of the tube, and d is the inside diameter of the tube. This bending moment of inertia defines the resistance to bending of the tube of a circular cross section about its center axis. The bending moment of inertia is an important concept since it defines the damper's ability to withstand operational induced stresses.

Typically, damper tubes are produced from roll formed sheet metal stock with welded mating edges, although the tube can also be impacted, drawn or extruded into a circular cylindrical form. This produces a convenient reservoir structure to facilitate end closure and for receiving the circular cylindrical cylinder tube. Since the top and/or bottom end closures are typically rolled closed, the circular cylindrical shape is advantageous. Typically, operational reciprocation of the piston within the cylinder tube results in some flexure induced rotation of the piston relative to the cylinder tube. Accordingly, the circular cylindrical shape advantageously accommodates the real world conditions.

Depending on piston rod size and reservoir size, a conventional damper may suffer undesirable oil starvation conditions. This can be complicated by a typical 10–15% oil loss over the extended life of an original equipment damper. During an extension cycle of a damper, oil is drawn into the working cylinder from the reservoir. Under oil starvation conditions, air may be drawn in along with the oil resulting in problematic cavitation conditions. Accordingly, a sufficiently large sized reservoir must be provided to avoid these conditions. Often the need to provide a larger reservoir conflicts with packaging constraints placed on the damper by the application. This leads to a need for greater flexibility in designing dampers for given applications than is presently available.

SUMMARY OF THE INVENTION

The present invention questions conventional thinking and results in a drastic departure from the customary damper reservoir tube structure. Rather than maintaining a circular cylindrical reservoir tube, the present invention utilizes a reservoir tube with a polygonal cross sectional shape. In the case of an optional square polygonal shape, the invention results in a reservoir tube with a bending moment of inertia defined by the equation:

$$I = \frac{1}{12}(H^4 - h^4),$$

where H is the distance across the outside of the tube and h is the distance across the inside of the tube. By changing from a round to a square shaped polygonal cross section reservoir tube, the bending moment of inertia for comparable wall thickness reservoir tubes is defined by the ratio $$\frac{I_{square}}{I_{circular}}$$

or 1.69:1. In the case of an optional rectangular polygonal shape, the invention results in a reservoir tube with a bending moment of inertia defined by the equation:

$$I = \frac{1}{12}(BH^3 - bh^3),$$

where B is the outside dimension of the long side of the rectangular cross section of the tube, H is the outside dimension of the short side of the rectangular cross section of the tube, , b is the inside dimension of the long side of the rectangular cross section of the tube, and h is the inside dimension of the short side of the rectangular cross section of the tube.

Advantageously, the increase in the moment of inertia enables greater design flexibility. For example, thinner tube wall sections are possible, resulting in desirable material and weight savings. Additionally, reduced outside lateral dimensions are possible for improved packageability. As another advantage, flat reservoir surfaces facilitate bracket mounting. Further, improved fatigue and stiffness properties can be achieved through proliferated cross sectional characteristic choices.

An embodiment of the present invention is characterized by a piston that is reciprocally carried in a circular cylindrical cylinder tube. The piston is attached to a piston rod that extends out from the cylinder tube and is adapted for connection to one of the sprung or unsprung masses of an associated vehicle. The circular cylindrical cylinder tube is carried in a reservoir tube that is adapted for connection to the other of the sprung and unsprung masses. The reservoir tube includes a mid-section with a polygonal cross section and includes an open end with a circular cross section. The open end is closed by a rod guide assembly that engages the reservoir tube and the cylinder tube. The reservoir tube includes a closed end opposite the open end that is optionally polygonal or circular in configuration. According to a preferred aspect of the present invention, a mounting bracket is utilized near the closed end of the reservoir tube and is engaged around the polygonal cross sectional part of the tube. According to another preferred aspect of the present invention, the reservoir tube carries a spring seat that is engaged with the reservoir tube and is fixed around the polygonal cross sectional part of the tube.

BRIEF DESCRIPTION OF THE DRAWINGS

The present invention will now be described, by way of example, with reference to the accompanying drawings, in which.

DESCRIPTION OF THE PREFERRED EMBODIMENT

Figures 1, 2:
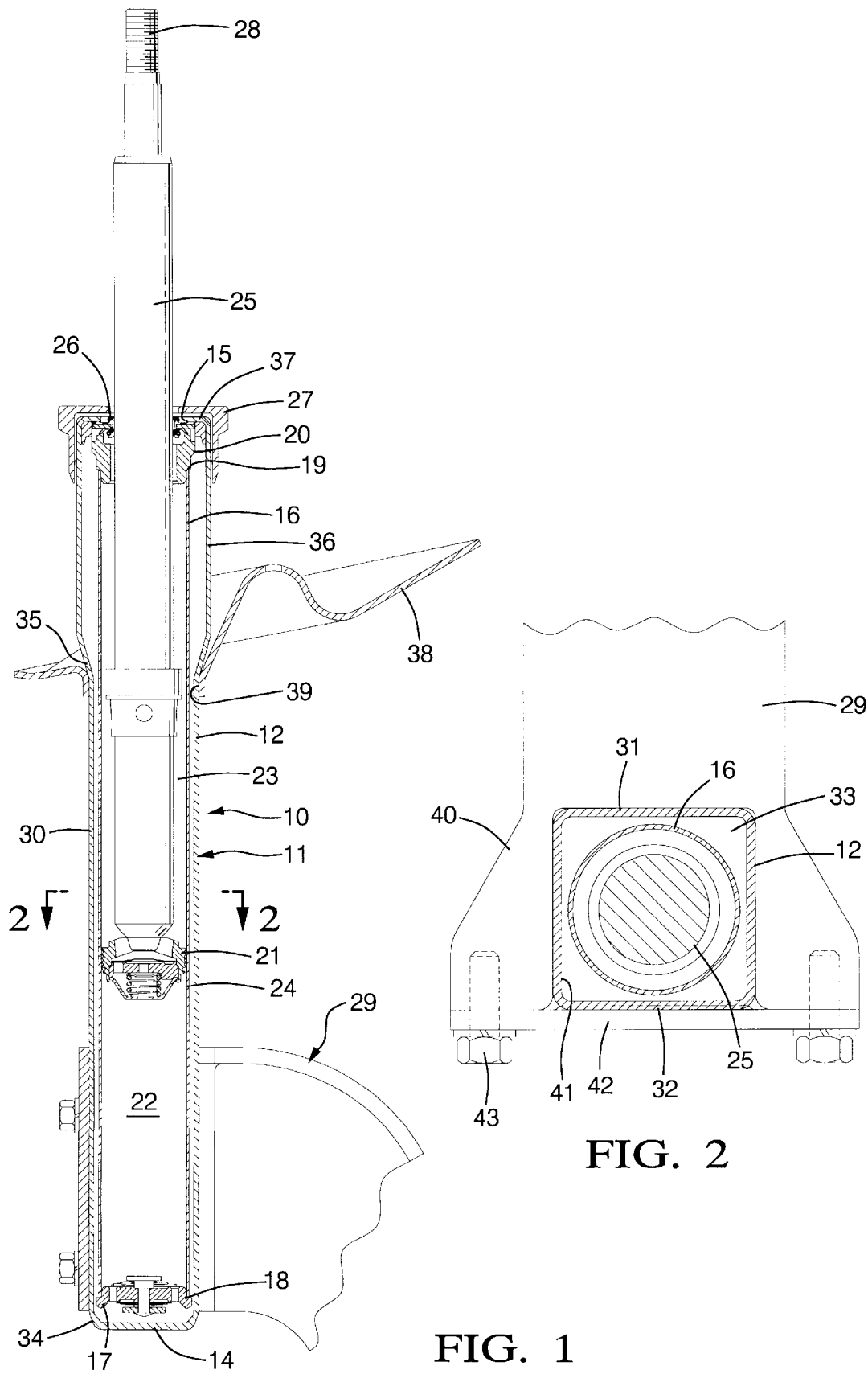
FIG. 1 is a fragmentary cross sectional illustration of a suspension damper according to the present invention.
FIG. 2 is a cross sectional illustration taken generally through the plane indicated by the line 2—2 in FIG. 1.

Referring to the drawings, illustrated in FIG. 1 is a McPherson strut assembly 10 that includes a twin-tube type damper assembly 11. Damper assembly 11 has an elongated reservoir tube 12 with an integrally formed closed end 14 and an open end 15. An elongated cylinder tube 16 is axially disposed within the reservoir tube 12 and has a consistent circular cross section. A reservoir 24 is defined between the reservoir tube 12 and the cylinder tube 16. A circular disk-like base valve assembly 17 is carried within the end 18 of cylinder tube 16, and the end 19 of cylinder tube 16 is secured on an annular rod guide assembly 20.

The cylinder tube 16 slidably supports a piston assembly 21 that separates the cylinder tube into compression chamber 22 and extension chamber 23. The compression chamber 22, extension chamber 23 and reservoir 24 carry a supply of fluid that operates as the damping medium within the damper assembly 11. Piston assembly 21 is connected to a piston rod 25 that extends through the extension chamber 23 and exits the damper assembly 11 through rod guide assembly 20, engaging seal 26 and extending from the open end 15 of reservoir tube 12. The open end 15 is partially closed over the rod guide assembly 20 thereby securing the rod guide assembly 20 in place, and a seal cover 27 is positioned over the open end 15.

The piston rod 25 includes a threaded end 28 that is adapted to be secured to the spring mass of an associated vehicle (not illustrated), and a mounting bracket 29 is provided near the closed end 14 of reservoir tube 12 for connection to the unsprung mass of the associated vehicle. As a result of relative movement between the sprung and unsprung masses, the piston assembly 21 is caused to reciprocally move within the cylinder tube 16 as the piston rod 25 enters and exits the damper assembly 11 through the rod guide assembly 20. Sliding movement of the piston assembly 21 within the cylinder tube 16 is inhibited by the action of fluid resistance which is caused to be generated by the restriction of fluid flow through the valving of piston assembly 21. As the piston assembly 21 moves, fluid travels between the compression chamber 22 and the extension chamber 23. Additionally, as the piston rod occupies a variable volumetric amount of the available area within the damper assembly 11, fluid is caused to flow through the base valve assembly 17 between the compression chamber 22 and the reservoir 24. Accordingly, the reservoir 24 must be sufficiently large to accommodate the varying fluid level, in addition to a compressible gas space that is optionally maintained within the reservoir 24 near the rod guide assembly 20.

The space occupied by the strut 10 is typically at a premium since the adjacent components of the vehicle's suspension system operate in very close proximity. Accordingly, damper engineers are often faced with strict packaging limitations in the design of products for given applications. These space limitations often conflict with a desire to maximize the size of the strut's reservoir. Maximizing the size of the reservoir is advantageous for a variety of reasons. First, a larger reservoir ensures that an adequate supply of oil is available for optimum strut operation. For example, if insufficient oil is available, the strut's valving may suffer from oil starvation. This can occur during extension operation when oil is drawn into the cylinder tube from the reservoir. Under the generated pressure differential, if gas is drawn into the cylinder tube along with the oil, cavitation can result and strut performance can be degraded. Second, a larger reservoir ensures that the oil supply is adequately housed in the reservoir during compression of the strut, and enables maximizing the size of the piston rod without overloading the reservoir. A problem faced when addressing these concerns is that increasing the size of the reservoir is accompanied by a packaging penalty.

In order to provide a sufficiently large reservoir 24, while at the same time minimizing the lateral dimension of the damper assembly 11, the present embodiment of the invention includes a reservoir tube 12 with a mid-section 30 having a polygonal cross section as shown in the FIG. 2. In particular, a square cross section is utilized that enables reducing the distance in the cross-car direction between sides 31 and 32 as compared to a round tube, while providing sufficiently large volume within the open area 33 to provide the fluid storage requirements for the strut 10. The square shape of mid-section 30 extends from a first square-to-round transition 34, to a second square-to-round transition 35. This is because in the present embodiment the closed end 14 is integrally formed in a round configuration from the reservoir tube 12, and the upper section 36 exhibits a round cross section for engaging the annular rod guide assembly 20 through the integrally formed leg 37 of reservoir tube 12. Taking advantage of the square tube mid-section 30, a spring seat 38 is provided for supporting a coil spring (not illustrated) upon which the sprung mass of the vehicle rests. Spring seat 38 includes a square opening 39 that is secured over the mid-section 30 adjacent the square-to-round transition 35 by typical a means such as welding. Providing a square-to square mating relationship between the spring seat 38 and the reservoir tube 12 significantly simplifies the assembly process of the strut 10. This is because the non-symmetrical shape of the spring seat 38 requires its proper orientation on the strut 10. Unlike the present invention, with a prior art round-to-round mating feature complicated fixturing is required to align a spring seat on a reservoir tube.

Similarly, the mounting bracket 29 is secured on the reservoir tube 12 at the square mid-section 30 and adjacent the square-to-round transition 34, greatly simplifying proper orientation relative to the spring seat 38 and the strut 10. The mounting bracket 29 includes a body 40 with a semi-square U-shaped opening 41 that receives the reservoir tube 12. The reservoir tube 12 is secured in position by a plate 42 that is fixed to the body 40 by a plurality of fasteners 43 clamping the damper 11 within the mounting bracket 29.

The relative reciprocal movement of the piston assembly 21 within the cylinder lube 16 results in longitudinal forces that are transferred via friction between the piston assembly 21 and the cylinder tube 16, and also between the piston rod 25 and the rod guide assembly 20. In addition, due to the nature of McPherson type struts, lateral forces in the suspension system are transferred between the piston rod 25 and the rod guide assembly 20, and also between the piston assembly 21 and the cylinder tube 16. These forces induce loads on the strut 10 that result in stresses at the juncture between the mounting bracket 29 and the reservoir tube 12. By utilizing a square shape for mid-section 30 of the reservoir tube 12, an increased capability to carry the stresses is made possible, since the moment of inertia for the square cross section is greater than the moment of inertia for a round reservoir tube of comparable wall thickness. In the case of a square polygonal shape, the invention results in a reservoir tube with a bending moment of inertia defined by the equation:

$$I = \frac{1}{12}(H^4 - h^4),$$

where H is the distance across the outside of the tube and h is the distance across the inside of the tube. The bending moment of inertia for a circular cylindrical reservoir tube of a certain thickness is defined by the equation:

$$I = \frac{\pi}{64}(D^4 - d^4),$$

where D is the outside diameter of the tube, and d is the inside diameter of the tube. By changing to a square shaped polygonal cross section reservoir tube, the bending moment of inertia for comparable wall thickness reservoir tubes is defined by the ratio $$\frac{I_{square}}{I_{circular}}$$

or 1.69:1. This increase in moment of inertia provides enhanced design flexibility by optionally allowing the use of a thinner wall section reservoir tube 12 as compared to the typical round reservoir tube, resulting in weight and material savings. Optionally, a comparable wall thickness can be maintained while reducing the overall dimension between the outer sides 31 and 32 for improved vehicle packaging, side load compensation, load carrying capability and simplified bracket attachment.

Figures 3, 4:
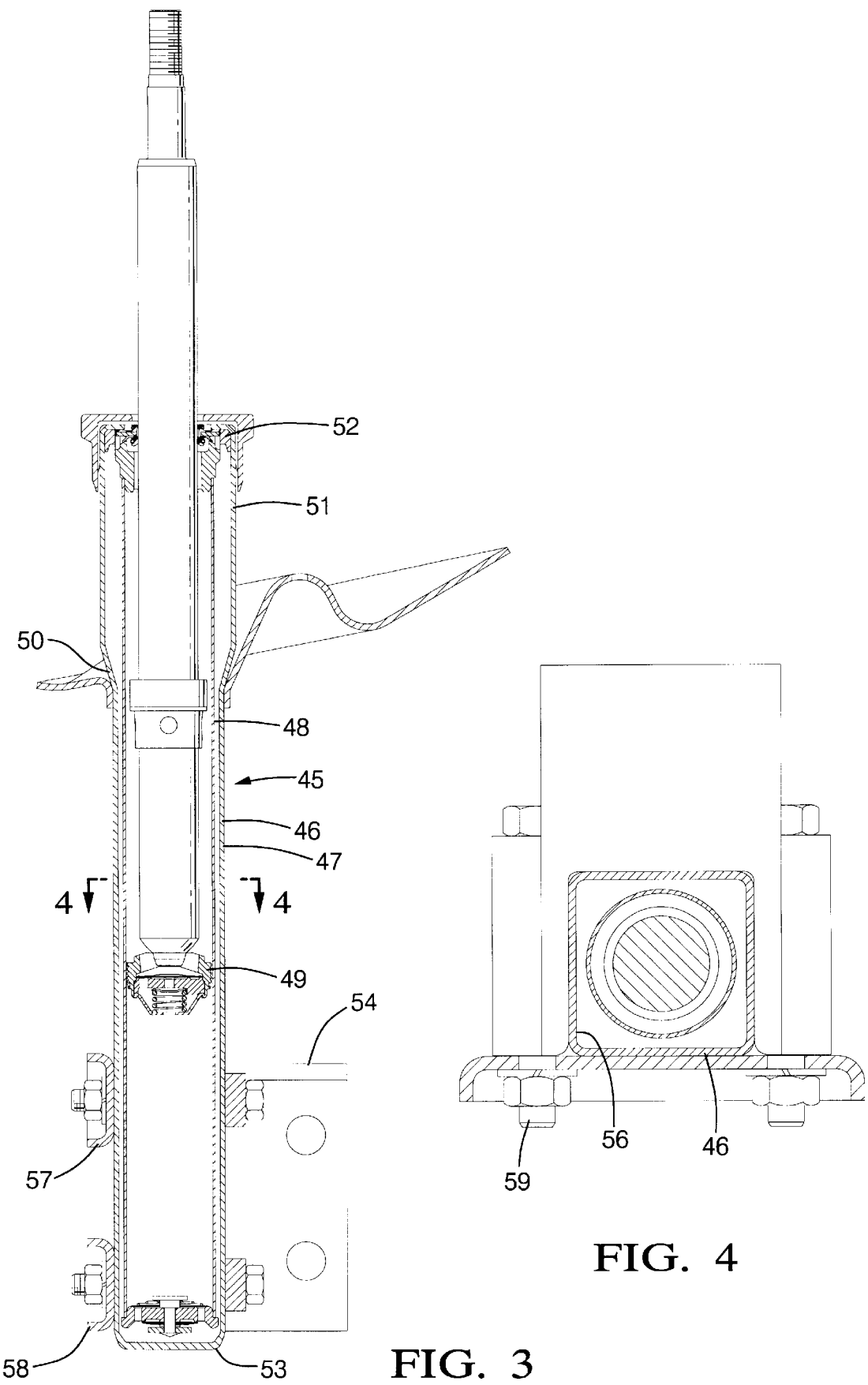
FIG. 3 is a fragmentary cross sectional illustration of a suspension damper according to the present invention.
FIG. 4 is a cross sectional illustration taken generally through the plane indicated by the line 4—4 in FIG. 3.

Referring to FIG. 3, an alternative embodiment of the present invention is illustrated as strut 45. Strut 45 similarly has a reservoir tube 46 with a mid-section 47 having a square cross-sectional shape as shown in FIG. 4. The strut 45 also has a circular cylindrical cylinder tube 48 that slidably carries piston assembly 49. Reservoir tube 46 includes a square-to-round transition 50 with the upper section 51 having a circular cross section for mating with annular rod guide assembly 52. In the present embodiment however, the closed end 53 of reservoir tube 46 remains square in shape and can be integrally formed with the wall of reservoir tube 46 or is preferably provided as a separate welded-on piece. Strut 45 includes a mounting bracket 54 with a body 55 that exhibits a semi-square U-shaped opening 56 as seen in FIG. 4, which receives the square section of reservoir tube 46. A pair of braces 57 and 58 are fixed to the mounting bracket body 55 by a plurality of fasteners 59 clamping the mounting bracket 54 to the reservoir tube 46.

Figure 5:
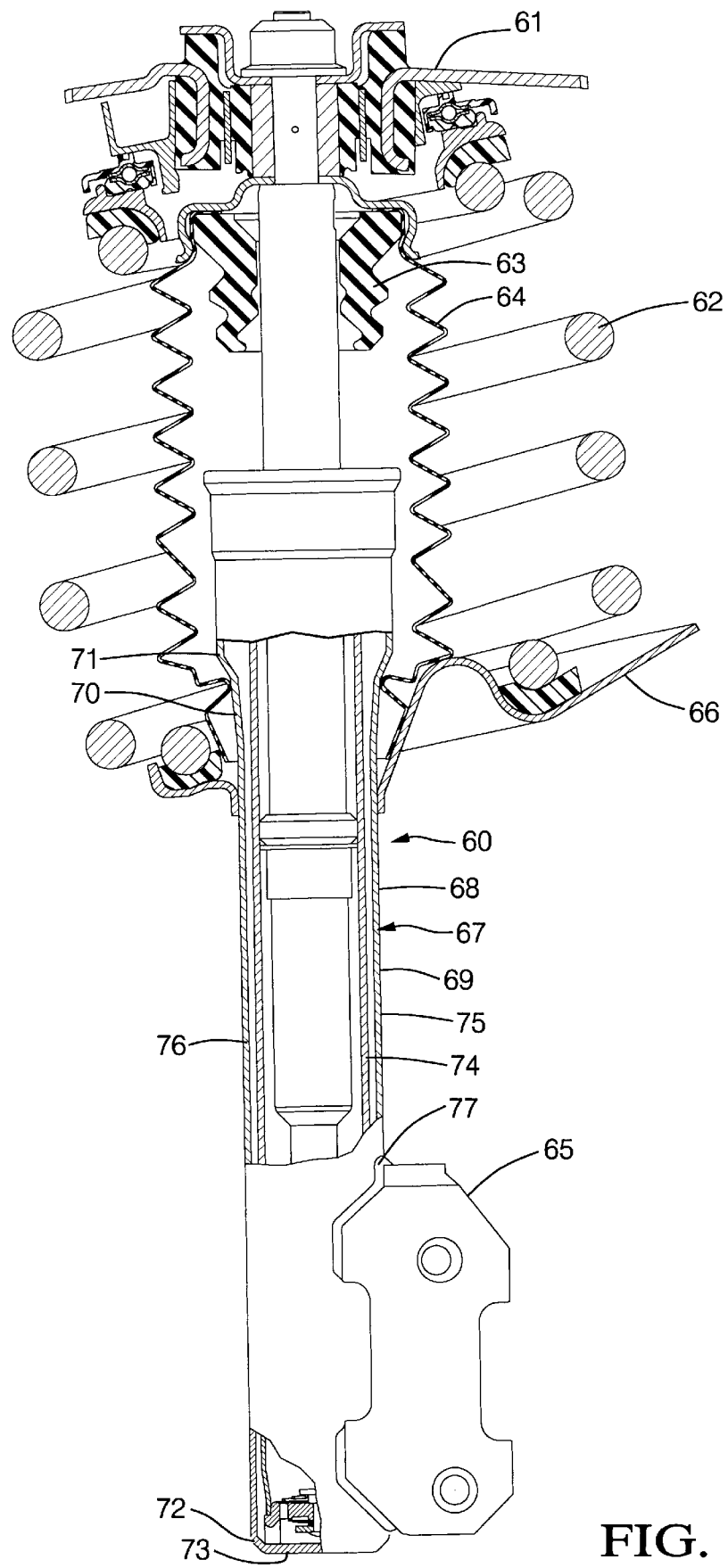
FIG. 5 is a is a fragmentary cross sectional illustration of a suspension damper according to the present invention.

Referring to FIG. 5, another embodiment of the present invention is illustrated as strut assembly 60. Strut assembly 60 is provided as a packaged unit including top-mount assembly 61, coil spring 62, jounce bumper 63, dust cover 64, mounting bracket 65, spring seat 66 and damper assembly 67. The strut assembly 60 is of the turnable type for use at the front corner of a vehicle, and is designed to operate as a damping device in the vehicle's suspension, while carrying both lateral and longitudinal forces that are transmitted through the suspension system.

Figure 7:
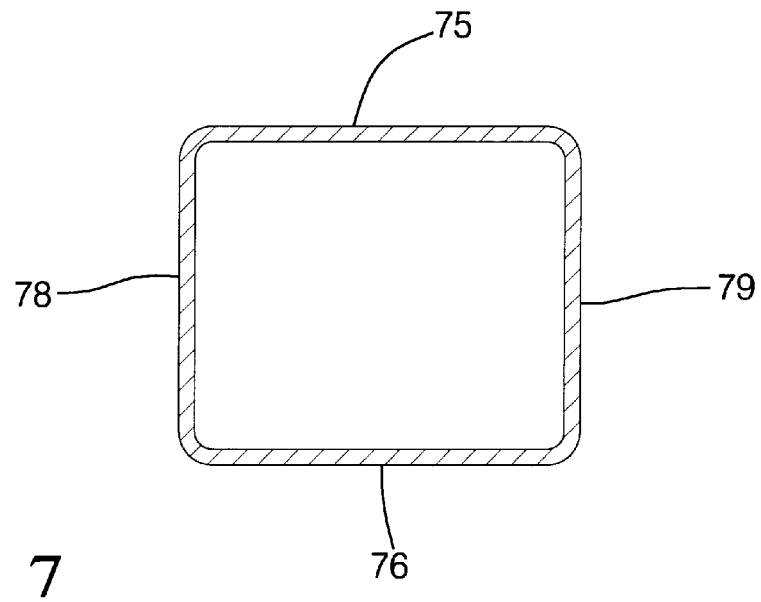
FIG. 7 is an exemplary polygonal cross section of a reservoir tube according to the present invention that can be used with the dampers of FIGS. 1, 3 and 5.

The damper assembly 67 includes a reservoir tube 68 having a mid-section 69 with a rectangular cross section as seen in FIG. 7. The reservoir tube 68 also includes a rectangular-to-round transition 70 with a circular upper section 71 and a rectangular-to-round transition 72 with a circular-shaped closed end 73. Selection of a rectangular shape provides a relatively thin outside dimension between the sides 75 and 76 so that the mid-section 69 occupies relatively little space and is preferably oriented with the short side of the rectangle in the cross-car direction. The long side of the rectangular cross section is preferably provided in the longitudinal vehicle direction. The mounting bracket 65 is relatively simply formed with a semi-squared shaped opening that is received over the reservoir tube 68 and is secured thereon by a weld bead 77.

The reservoir tube 68 carries a circular cylindrical cylinder tube 74 so that the sides 75 and 76 of the reservoir tube 68 are positioned relatively close to the cylinder tube 74. The sides 78 and 79 (as seen in FIG. 7), at the ends of the long side of the rectangular shape, provide sufficient distance from the cylinder tube 74 to ensure that an adequately large reservoir volume is provided. For the rectangular reservoir tube section, the bending moment of inertia is defined by the equation:

$$I = \frac{1}{12}(BH^3 - bh^3),$$

where B is the outside dimension of the long side of the rectangular cross section of the tube, H is the outside dimension of the short side of the rectangular cross section of the tube, , b is the inside dimension of the long side of the rectangular cross section of the tube, and h is the inside dimension of the short side of the rectangular cross section of the tube.

Figure 6:
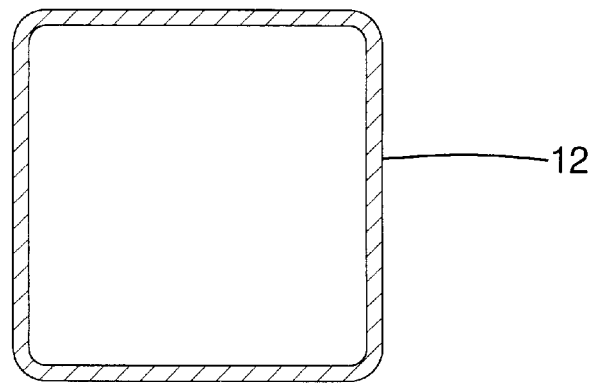
FIG. 6 is an exemplary polygonal cross section of a reservoir tube according to the present invention that can be used with the dampers of FIGS. 1, 3 and 5.
Figure 8:
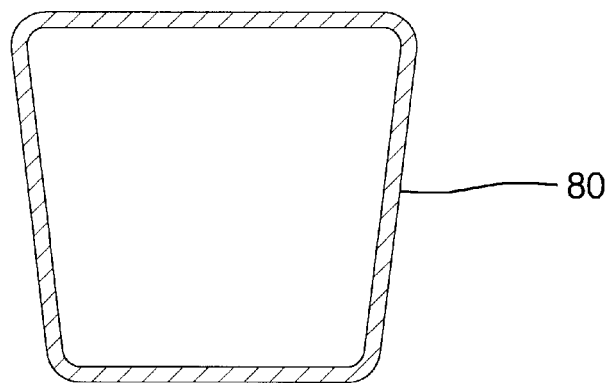
FIG. 8 is an exemplary polygonal cross section of a reservoir tube according to the present invention that can be used with the dampers of FIGS. 1, 3 and 5.

Referring to FIG. 6, a schematic representation of the cross section of the reservoir tube 12 of strut 10 as shown in FIG. 1, and the reservoir tube 46 of strut 45 as shown in FIG. 3, is illustrated. Referring to FIG. 7, a schematic representation of the rectangular cross section of the reservoir tube 68 of strut assembly 60 as shown in FIG. 5 is illustrated. Referring to FIG. 8, a schematic representation of the cross section of a reservoir tube according to another embodiment of the present invention is illustrated. The reservoir tube 80 is provided in a trapezoidal shape and provides a further alternative to the square shape of the reservoir tube of FIG. 6 and the rectangular shape of the reservoir tube of FIG. 7.

Figure 9:
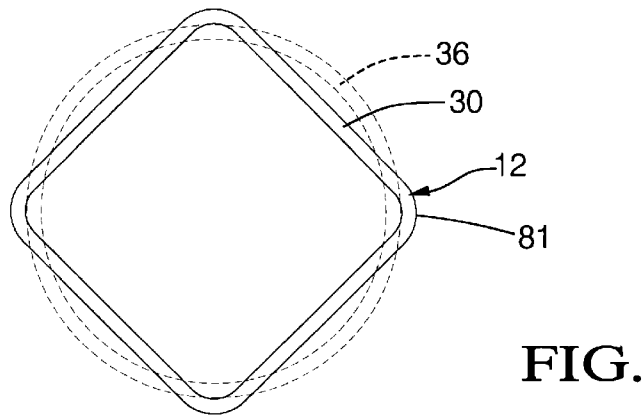
FIG. 9 is a schematic illustration showing a round-to-square tube formation relationship.

As shown in FIG. 9, the square mid-section 30 of reservoir tube 12 is formed from a preliminarily round tube which corresponds to the upper section 36. The distance across the square mid-section 30 is 45 millimeters in the present embodiment, which is developed from the same perimeter as the upper section 36 which has an inside diameter of 50 millimeters and a wall thickness of two millimeters. To accommodate excess material, the corners 81 of the mid-section 30 each have a radius of approximately 6.35 millimeters.

Figure 10:
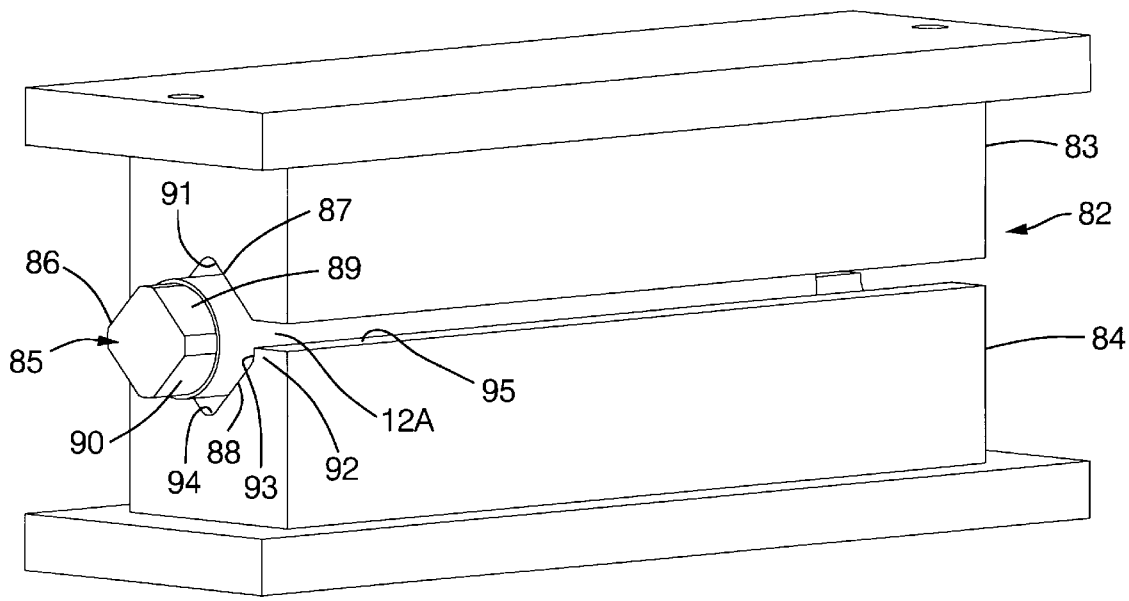
FIG. 10 is a round-to-square tube forming device.

Referring to FIG. 10, a device for forming the square shaped mid-section 30 of the reservoir tube 12 is illustrated. The die 82 comprises an upper die section 83 and a lower die section 84 that are adapted to be connected to opposed platens of a press (not illustrated). Initially, starting with a round cylindrical tube 12A with or without an integrally formed closure on one end, a 41 millimeter square mandrel 85 is inserted into the tube 12A. Mandrel 85 includes rounded corners 86 that lie on a 50 millimeter diameter across the mandrel. Tube 12A has an inside diameter of 50 millimeters and an outside diameter of 54 millimeters with a consistent wall thickness of 2 millimeters.

A key consideration in the squaring process is the redistribution of tube material without creating a positive or negative wall thickness result, while moving material to form the new shape. Therefore, upon initial closure of the upper and lower die sections 83 and 84 onto the tube 12A as supported by the mandrel 85, tangents 87 and 88 and two similar tangents (not visible) around the tube 12A are contacted. The tangents 87 and 88 are substantially centered across the flats 89 and 90 of the mandrel 85. This initial contact allocates the material of tube 12A to four quadrants in order to form corners from the round tube without pushing material around the corners. As the tube material at the tangents is moved toward the mandrel 85, the material adjacent the rounded corners 86 pulls away from the mandrel 85 to form the corners of the polygonal shape.

The bottom die section 84 includes a wrapped leg 92 which extends around the corner 93, and a similar leg on the opposite side of the tube 12A. As the upper and lower die sections 83 and 84 are completely close, square sides of the tube 12A are defined between the flat sides of the mandrel 85 and the planar sides of the die cavities. The four tangent points including tangents 87 and 88, are placed at 45 degrees offset from the horizontal and vertical. The offset tangent points apply a symmetrical load to the tube 12A forcing material to be evenly distributed around the mandrel 85 and within the cavity 91 of upper die 83, and the cavity 94 of lower die 84. The material of the tube 12A uniformly fills the cavities 91 and 94 as the die 82 closes. This process ensures the uniform reshaping (redistribution) of the round tube material while minimizing internal stresses within the material.

The tube 12A is initially contacted at the tangents, with a uniform load applied until restrained by the center support mandrel 85. This allows each straight segment of square tubing to be formed from its immediately closest round tube section. The corners are formed from the nearest available material minimizing the possibility of tube ruptures. Extending the leg 92 of lower die section 84 around the tube 12A at the parting line 95 traps the material at the corner 93 preventing the formation of a pinch point as the (die 82 closes. This prevents notch factor stress concentration from occurring and accommodates variations due to permitted tolerances in the thickness of the material of tube 12A, which are absorbed into the thickness of the corner, while a uniform thickness across the flat sides of the tube is produced with the flat sides compressed between the planar sides of the die cavities 91, 94 and the flat sides of the mandrel 85.

Figure 11:
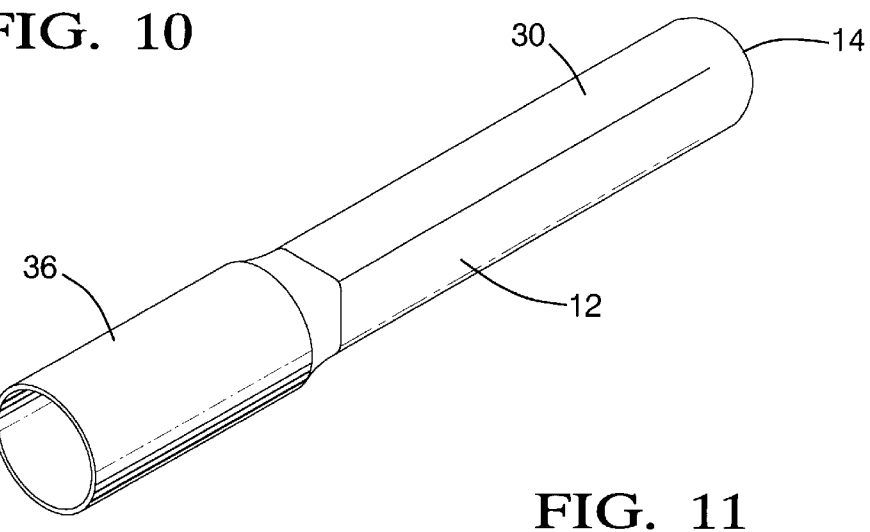
FIG. 11 is a perspective illustration of the reservoir tube of the suspension damper shown in FIG. 1.

Referring to FIG. 11, the resultant reservoir tube 12 is illustrated in perspective with the square shape to mid-section 30 shown as formed in the die 82. The round integral bottom closure at closed end 14 and the round upper section 36 remain unreformed. The selected location of the square-to-round transitions is determined by the amount of the round section of the tube 12A that is permitted to extend from the ends of cavities 91,94 and can be completely omitted if preferred.

Figure 12:
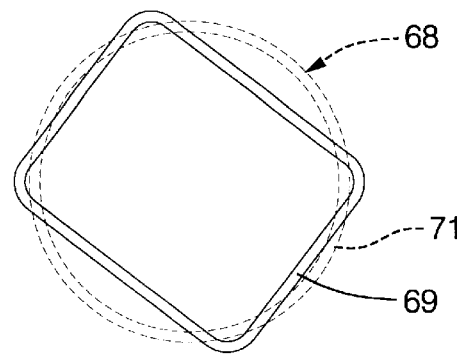
FIG. 12 is a schematic illustration showing a round-to-rectangular tube formation relationship.

In FIG. 12 the formation of a rectangular tube section from a round tube is illustrated schematically. For a reservoir tube 68 as used in the strut assembly 60 of FIG. 5, a rectangular mid-section 69 having outside dimensions across its sides of 55 millimeters and 45 millimeters with corner radii of approximately 6.35 millimeters is formed from a round tube section having an outside diameter of 60 millimeters with a 2 millimeter thick wall. The 60 millimeter diameter round section remains at the upper section 71.

Figure 13:
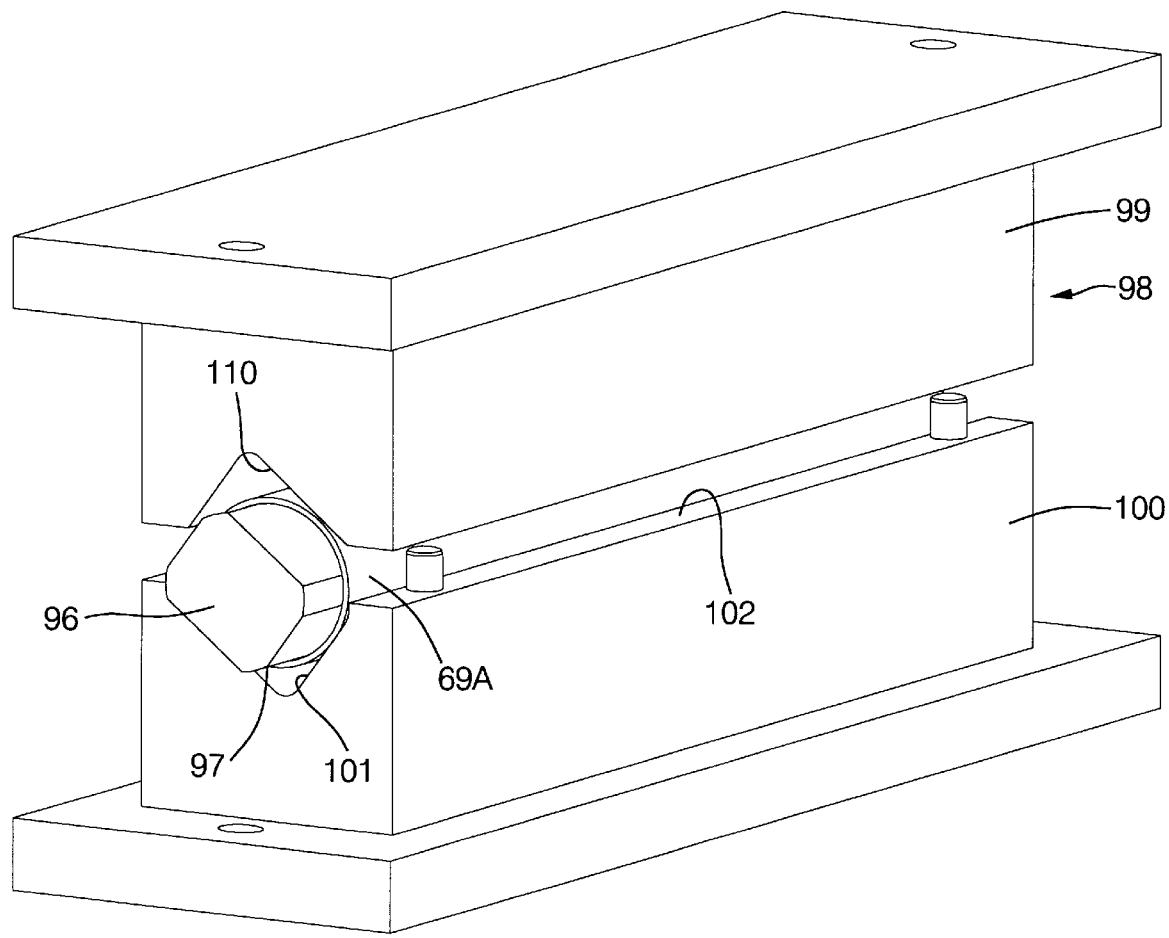
FIG. 13 is a round-to-rectangular tube forming device.
Figure 15:
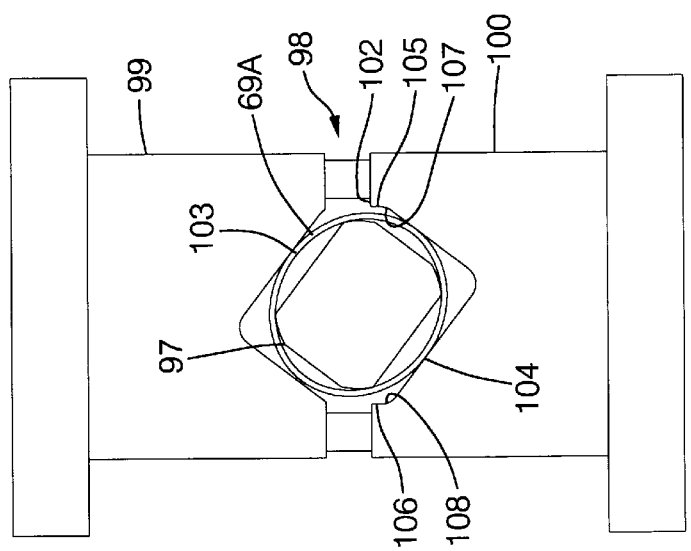
FIG. 15 is a stage of a round-to-rectangular tube forming operation.
Figure 14:
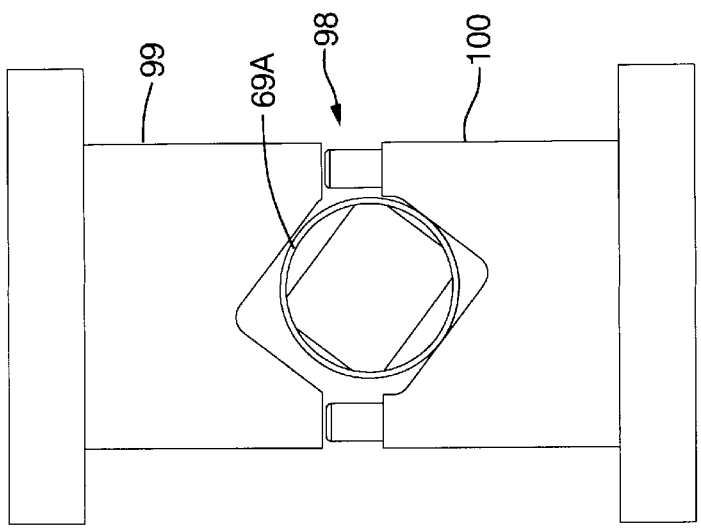
FIG. 14 is a stage of a round-to-rectangular tube forming operation.

In forming the rectangular shape of mid-section 69, the redistribution of material is important. As shown in FIG. 13, a round tube 69A is supported on a 45 millimeter×51 millimeter mandrel 96, having rounded corners 97 that match the 56 millimeter inside diameter of tube 69A. A die 98 having an tipper die section 99 and a lower die section 100 includes an upper die cavity 110 and a lower die cavity 101 that together define an elongated opening with a cross section 45 millimeters×55 millimeters having 6.35 millimeter rounded corners, when the die sections 99 and 100 are closed at the parting line 102. Referring to FIGS. 14 and 15, it is apparent that the distance the material of rounded tube 69A must be moved to produce the rectangular shape is different than the distance required to form a uniformly square-shaped tube. In forming a rectangular section, the contact points 103 and 104 for the material that must move the furthest distance make contact first, initially producing an oval shape from the tube 69A. The lower die section 100 includes legs 105 and 106 that wrap around the corners 107 and 108 to prevent pinching of material from the tube 69A in the part line 102. After initial contact between the die sections 99, 100 and the tube 69A, the material of the tube 69A separates from the rounded corners 97, initially at opposite ends of adjacent rounded corners and next to the short sides of the rectangular-shaped mandrel 96.

Figure 16:
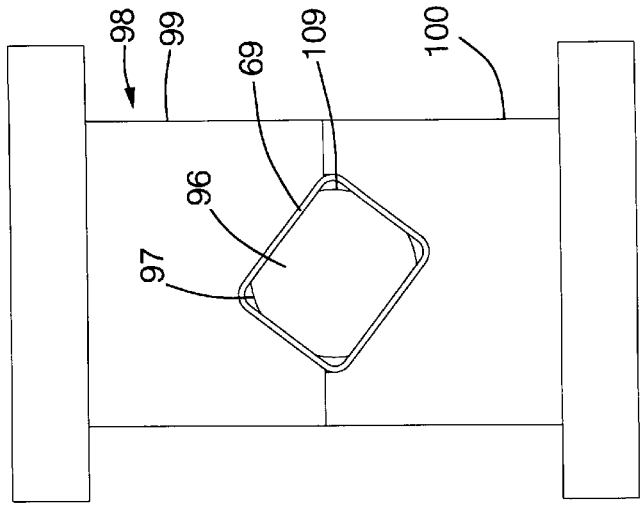
FIG. 16 is a stage of a round-to-rectangular tube forming operation.

Referring to FIG. 16, as the upper and lower die sections 99 and 100 approach complete closure, the rectangular shape of the tube 69 is formed, with voids 109 opened between the tube 69 and the rounded corners 97 of the mandrel 96. Uniform thickness of the tube 69 is maintained across the flat sides by compression of the tube between the flat sides of the mandrel and the planar sides of the die cavities. The process accumulates any added thickness at the corners of the tube 69 adjacent the voids 109 since the corners are formed last with material length being pushed to the corner due to clearance between the inside of the tube and the mandrel adjacent voids 109.

Accordingly, the present invention provides a vehicle suspension damper with a polygonal reservoir tube that solves the problem of packaging a shock or a strut into a limited space environment. Additionally, strength and fluid storage improvements allow enhanced design freedom in applying dampers to new applications.

What is claimed is:

1. A suspension damper comprising:
a piston reciprocally carried in a circular cylindrical cylinder tube, the piston being attached to a piston rod extending out from the cylinder tube, wherein the circular cylindrical cylinder tube is carried in a reservoir tube that includes a mid-section with a polygonal cross section and includes an open end with a circular cross section, wherein the open end is closed by a rod guide assembly that engages the reservoir tube and the cylinder tube.

2. A suspension damper according to claim 1 wherein the reservoir tube includes a closed end opposite the open end that is circular in configuration.

3. A suspension damper according to claim 1 further comprising a mounting bracket fixed near the closed end of the reservoir tube around the polygonal cross section mid-section of the reservoir tube.

4. A suspension damper according to claim 3 further comprising a spring seat fixed on the reservoir tube around the polygonal cross section mid-section of the reservoir tube.

5. A suspension damper according to claim 4 wherein the reservoir tube includes a polygonal-to-round transition, wherein the spring seat is engaged adjacent the polygonal-to-round transition.

6. A suspension damper according to claim 3 wherein the mounting bracket includes a body with a U-shaped opening that receives the reservoir tube and includes a plate that is clamped to the body capturing the reservoir tube in the mounting bracket.

7. A suspension damper according to claim 6 wherein the reservoir tube includes a closed end opposite the open end and includes a polygonal-to-round transition near the closed end, wherein the mounting bracket is positioned adjacent the polygonal-to-round transition.

8. A suspension damper according to claim 1 wherein the polygonal cross section is rectangular in shape.

9. A suspension damper according to claim 1 wherein the polygonal cross section is trapezoidal in shape.

10. A suspension damper according to claim 1 wherein the polygonal cross section is square in shape.

11. A suspension damper comprising:
a cylindrical cylinder tube having a substantially constant circular cross section;
a piston reciprocally carried in the cylinder tube and having a round outer periphery;
a piston rod connected to the piston and extending from the cylinder tube;
a base valve assembly carried in the cylinder tube and having a round outer periphery;
a reservoir tube carrying the cylinder tube and having a closed end with the base valve positioned near the closed end wherein the reservoir tube has an open end carrying a rod guide assembly wherein the piston rod extends through the rod guide assembly and wherein the rod guide assembly supports the piston rod and is engaged with the cylinder tube wherein the closed end of the reservoir tube has a circular cross section and wherein the open end of the reservoir tube has a circular cross section and wherein between the closed end and the open end the reservoir tube includes a mid-section that has a polygonal cross section.

12. A suspension damper according to claim 11 wherein the open end of the reservoir tube is partly closed over the rod guide assembly, capturing the rod guide assembly in position and closing the open end.

13. A suspension damper according to claim 11 further comprising a mounting bracket fixed near the closed end of the reservoir tube around the polygonal cross section mid-section of the reservoir tube so that stresses developed by movement of the piston in the cylinder tube are transferred to the bracket through the mid-section.

14. A suspension damper according to claim 13 further comprising a spring seat fixed on the reservoir tube around the polygonal cross section mid-section of the reservoir tube.

15. A suspension damper according to claim 14 wherein the reservoir tube includes a polygonal-to-round transition, wherein the spring seat is engaged adjacent the polygonal-to-round transition.

16. A suspension damper according to claim 13 wherein the mounting bracket includes a body with a U-shaped opening that receives the reservoir tube and includes a plate that is clamped to the body capturing the reservoir tube in the mounting bracket and wherein the reservoir tube includes a polygonal-to-round transition near the closed end, wherein the mounting bracket is positioned adjacent the polygonal-to-round transition inhibiting movement of the mounting bracket relative to the reservoir tube.

17. A suspension damper according to claim 11 wherein the polygonal cross section is rectangular in shape.

18. A suspension damper according to claim 11 wherein the polygonal cross section is trapezoidal in shape.

19. A suspension damper according to claim 11 wherein the polygonal cross section is square in shape.

20. A suspension damper for damping oscillatory motion and for carrying reaction and side-load forces comprising:
a cylinder tube having a cylindrical shape with a substantially constant circular cross section wherein the cylinder tube has a first end and a second end;
a piston reciprocally carried in the cylinder tube between the first and second ends and having a round outer periphery and carrying a damping valve assembly wherein the piston separates the cylinder tube into extension and compression chambers that carry a fluid supply wherein movement of the piston within the cylinder tube is resisted by the action of the fluid which is forced through the valve assembly;

a piston rod connected to the piston and extending through the extension chamber and out from first end of the cylinder tube;

a base valve assembly carried in the second end of the cylinder tube and having a round outer periphery;

a reservoir tube carrying the cylinder tube and having a closed end with the base valve positioned near the closed end wherein the reservoir tube has an open end carrying a rod guide assembly wherein the piston rod extends through the rod guide assembly and wherein the rod guide assembly supports the piston rod and is engaged with the cylinder tube wherein the closed end of the reservoir tube has a circular cross section and wherein the open end of the reservoir tube has a circular cross section and wherein between the closed end and the open end the reservoir tube includes a mid-section that has a polygonal cross section; and a mounting bracket wherein the mounting bracket includes a body with a U-shaped opening that receives the reservoir tube and includes a plate that is clamped to the body capturing the reservoir tube in the mounting bracket and wherein the reservoir tube includes a polygonal-to-round transition near the closed end, wherein the mounting bracket is positioned adjacent the polygonal-to-round transition inhibiting movement of the mounting bracket relative to the reservoir tube.

* * * * *